United States Patent [19]

Plummer et al.

[11] Patent Number: 5,287,867
[45] Date of Patent: Feb. 22, 1994

[54] APPARATUS AND METHOD FOR INSURING AND CONTROLLING TURBULENT FLOW FOR CLEANING DUCTS

[75] Inventors: Raymond G. Plummer; Raymond J. Foley, both of Toledo, Ohio; J. Thomas Schaffer, Temperance, Mich.

[73] Assignee: Plummer Design & Technologies, Inc., Toledo, Ohio

[21] Appl. No.: 894,959

[22] Filed: Jun. 8, 1992

[51] Int. Cl.$^5$ .............................................. B08B 3/02
[52] U.S. Cl. .............................. 134/56 R; 134/102.1; 134/166 C; 134/169 C
[58] Field of Search ............... 134/22.12, 22.18, 102.1, 134/102.2, 56 R, 57 R, 58 R, 166 C, 167 C, 168 C, 169 C; 55/223; 261/DIG. 76; 431/12; 137/7, 4, 212, 897, 87

[56] References Cited

U.S. PATENT DOCUMENTS

| | | | |
|---|---|---|---|
| 2,262,102 | 11/1941 | Hunter | 299/84 |
| 3,572,366 | 3/1971 | Wiggins | 137/240 |
| 3,778,240 | 12/1973 | Naiman | 134/22.15 |
| 3,981,320 | 9/1976 | Wiggins | 137/240 |
| 4,419,141 | 12/1983 | Kinkel | 134/22.12 |
| 4,497,341 | 2/1985 | Wright | 137/563 |
| 4,581,074 | 4/1986 | Mankina et al. | 134/22.12 |
| 4,627,465 | 12/1986 | Kolibas et al. | 137/563 |
| 4,657,047 | 4/1987 | Kolibas | 137/881 |
| 4,828,768 | 5/1989 | Talmor | 55/223 |
| 4,874,002 | 10/1989 | Sundholm | 134/111 |
| 4,874,400 | 10/1989 | Jury | 55/223 |
| 4,881,563 | 11/1989 | Christian | 134/166 |
| 4,902,352 | 2/1990 | Christian | 134/22.12 |
| 4,913,856 | 4/1990 | Morton | 261/DIG. 76 |
| 5,007,444 | 4/1991 | Sundholm | 134/102 |
| 5,072,487 | 12/1991 | Walton | 15/406 |

*Primary Examiner*—Frankie L. Stinson
*Attorney, Agent, or Firm*—Hugh Adam Kirk

[57] ABSTRACT

This invention concerns a system for insuring and accurately controlling the turbulent flow of a pressurized mixture of a gas and a cleaning fluid for purging and cleaning ducts. The pressures of cleaning fluid and the gas are continuously sensed and transduced into electrical signals for controlling valves for the pressurized gas to maintain and insure its pressure at a predetermined amount relative to the pressure of said cleaning fluid, so that when the gas and fluid are mixed in a turbulator, turbulent flow is insured. The improvements of this circuit include a pressure sensor transducer for sensing the pressure of the input of the air to the turbulator and feeding it back to the main air pressure transducer for accurately maintaining a predetermined ratio between the gas and cleaning fluid pressures within less than about 1 psi in at least pressures of 150 psi. A pressure warning signal indicates when the gas and/or cleaning fluid pressure is too low to produce effective turbulent flow. Furthermore, since the circuitry is so sensitive, a low pass filter is connected to the output of the cleaning fluid transducer to prevent unnecessary operation of the valves that control the gas pressure to the turbulator when the circuit is in its standby mode, thereby increasing the life of these gas control valves. An enrichment circuit for the cleaning fluid pressure sensors may vary the differences in pressure between the cleaning fluid and gas, not only for different cleaning fluids, but also during turbulation. Furthermore, the accurate control of the relative pressures of gas and cleaning fluid in the turbulator enables the turbulent flow mixture not only to clean the ducts, but also to simultaneously purge them.

35 Claims, 2 Drawing Sheets

APPARATUS AND METHOD FOR INSURING AND CONTROLLING TURBULENT FLOW FOR CLEANING DUCTS

RELATED APPLICATION AND BACKGROUND OF THE INVENTION

This invention is an improvement in copending U.S. Pat. application Ser. No. 07/849,457, filed Mar. 11, 1992, assigned to the same assignee as this application.

Previously the pressures between a cleaning liquid and a gas often varied as much as 5 psi, causing variable turbulence which affected the efficiency of the cleaning of ducts, both in increased time and increased amount of the cleaning liquid.

SUMMARY OF THE INVENTION

Generally speaking, this invention comprises improvements in a system for producing in a turbulator a turbulent flow of a mixture of a gas and a cleaning fluid for cleaning ducts, such as the hoses and apparatus employed in automatic spray-painting systems. In order to obtain such turbulent flow of the mixture, pressure sensor transducers are connected to the source of the cleaning fluids or solvents and to the pressurized gas or air so as to maintain a predetermined difference in pressures necessary for producing the most effective turbulent flow. Although electronic means were employed for controlling valves in the output from the gas source relative to the cleaning fluid pressure, in order to control more accurately the relative pressures between the gas the cleaning fluid or fluids, an additional pressure sensor transducer and feedback circuit is connected to the input of the gas into the turbulator. This enables maintaining a predetermined difference in pressure between the gas and the cleaning fluid to be less than 1 psi for pressures up to about 150 psi, thus insuring a more accurate and more efficient turbulent flow produced in the turbulator.

In the event the pressure of any of the cleaning fluids or gas falls below a predetermined amount below which turbulent flow cannot be effectively or efficiently produced in the turbulator, a special low pressure comparator circuit connected to the cleaning fluid and gas transducers generates an output warning signal which can automatically shut off the system and notify the operator thereof.

- In view of the increased accuracy of the relative differences in pressures between the cleaning fluid or solvent and the gas or air, selective low pass filter circuits are provided in the output circuits from the cleaning fluid pressure transducers to select the desired signals and during standby operation to average the output signals, thus preventing unnecessary operation of the electromagnetic valves controlled by the gas pressure transducer. These selective low pass filter circuits are connected to summing junctions which in turn are connected to a data selector in which one or more of a plurality of cleaning fluids are preselected. This data selector is directly connected to the pressure transducer for the gas control valves in a volume booster regulator connected to the pressurized gas source.

The system also contains manually and remotely controlled enhancement and enrichment circuits connected to the summing junctions which can control varying the relative pressures between the cleaning fluids and the gas for not only maintaining a given difference in pressures, but also for varying this difference, even during the production of the turbulent flow of the mixture of said cleaning fluid and gas.

Because of the accuracy which can be obtained in producing turbulent flows, it is possible that this system can simultaneously purge as well as clean the ducts to be cleaned.

OBJECTS AND ADVANTAGES

Accordingly, it is an object of this invention to improve the turbulent flow mixture for purging and cleaning ducts and apparatus-containing ducts in a new, simple, efficient, effective and accurate manner.

Another object is to provide means for accurately controlling the relative pressures between a cleaning fluid and a gas for producing a highly effective turbulent flow of the mixtures thereof, namely within less than 1 psi for pressures up to about 150 psi for the gas and cleaning fluid.

Another object is to provide a warning signal for an operator of a turbulent flow generating system that the pressure of the gas and/or one of the cleaning fluids is less than that necessary for producing effective turbulent flow.

Another object is to provide circuitry for damping out or averaging small variations in the pressures of the cleaning fluids to reduce operation of the valves for controlling the gas to the turbulator during standby operation, thus increasing the life of these valve by reducing the number of times they need to operate.

A further object is to produce a turbulent flow system that has means for varying the relative pressures between the gas and the cleaning fluid mixture, not only before but even during the production of the turbulent flow mixture.

A still further object is to simultaneously purge and clean ducts by a turbulent flow mixture.

BRIEF DESCRIPTION OF THE DRAWING

The above mentioned and other features, objects and advantages, and a manner of attaining them are described more specifically below by reference to an embodiment of this invention shown in accompanying combined drawings wherein.

DETAILED DESCRIPTION OF PREFERRED EMBODIMENT

Figure 1A:
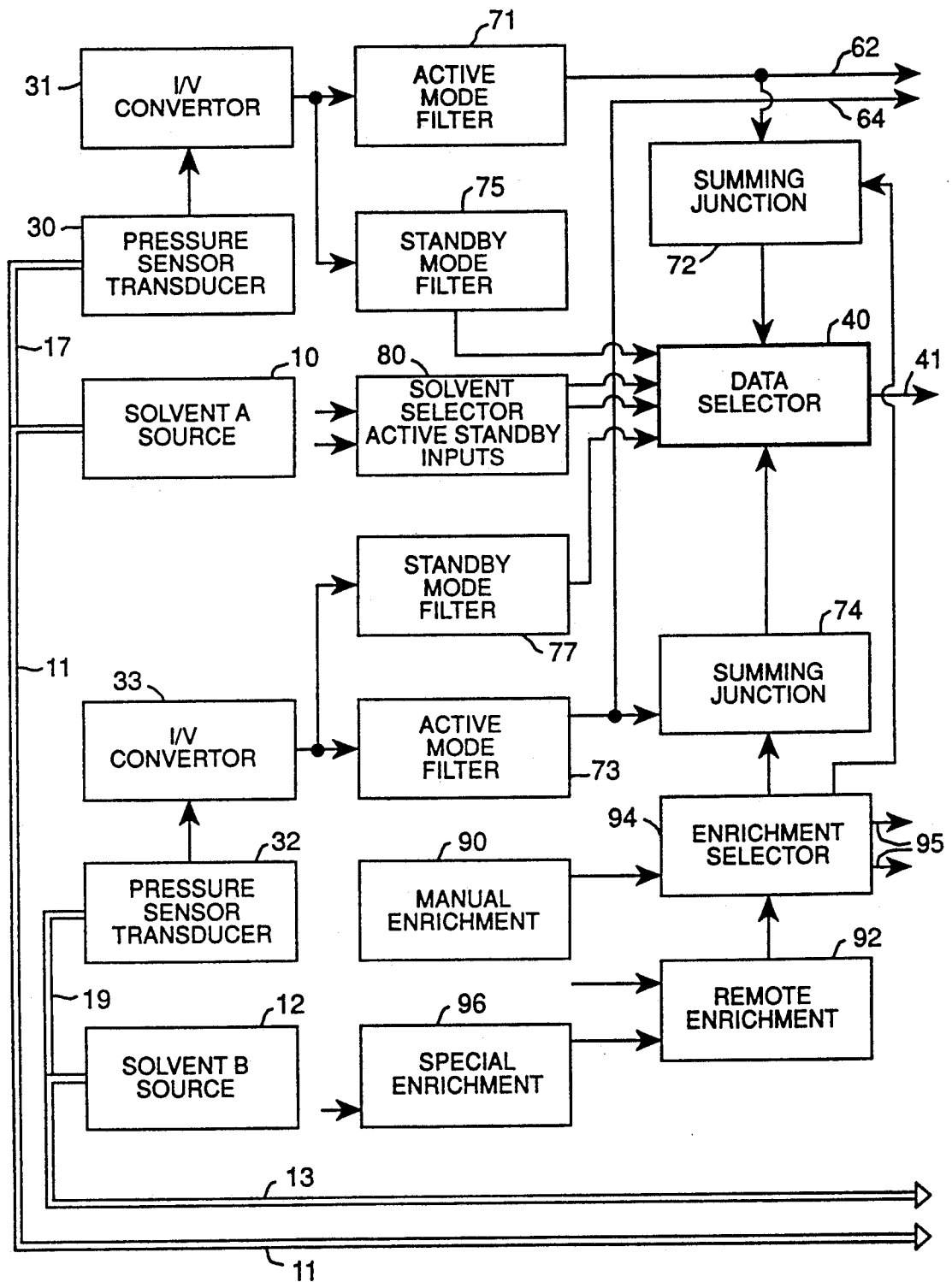
FIGS. 1A and 1B together form a single flow diagram and chart of a preferred embodiment of this invention showing: the hydraulic and electronic circuits that control a mixture of one or more cleaning fluids with a gas and mix them in a turbulator to produce a turbulent flow mixture for cleaning ducts.

Referring to the attached diagram, there is shown in FIG. 1A two sources for pressurized cleaning fluids, which fluids may be a solvent, water, or other liquid including a liquid suspension of abrading particles. Herein one cleaning fluid is indicated as solvent A in source 10 and the other as solvent B in source 12 which are connected by ducts 11 and 13, respectively, to a turbulator 20 (see FIG. 1B) where the liquids are mixed with a pressurized gas, which may be air, nitrogen or other gas, in a source 14 via valves in a volume booster regulator 15 through duct 16 to mix with a solvent in the turbulator 20. The pressure of the gas mixed with a pressurized solvent A or B in the turbulator 20, is controlled to produce and maintain a turbulent flow of the mixture which is forced through the outlet 21 connected to the ducts and/or apparatus to be cleaned and purged by this mixture.

Connected to the output ducts 11 and 13 (see FIG. 1A) from the solvent A and solvent B sources, are connections 17 and 19, respectively, to pressure sensor transducers 30 and 32, respectively. These transducers convert the sensed pressures into current values which in turn are connected to current-to-voltage converters 31 and 33, respectively. The resulting voltages are then passed through additional circuits (to be described later) to a data selector circuit 40 which in turn is connected directly via a conductor 41 to voltage-to-pressure (E/P) transducer 50 (see FIG. 1B) which controls the valves in the volume booster regulator 15 for regulating the pressure of the gas or air from the source 14 before it enters the duct 16 to the turbulator 20. Although the pressure of the gas or air in the source 14 is detected or sensed in the transducer 50, it is always greater than any pressure that is to be applied to the turbulator 20 via conductor 16.

In order to more accurately control the pressure of the gas or air in duct 16, there is provided a pressure sensor transducer 52 (see FIG. 1B) connected by duct 53 to the duct 16 for sensing the input pressure to the turbulator 20 and feeding the transduced voltage of this pressure back into the E/P transducer 50 so as to maintain more accurately the predetermined pressure differential between the solvent in lines 11 and 13 and the gas in line 16 for producing an effective turbulent flow in turbulator 20. This feedback circuit through sensor 52 thus can control the pressure of the air in duct 16 via the electromagnetic or solenoid valves in the regulator 15 to within less than 1 psi of the relative pressure to that of the solvent A or B in the respective lines 11 or 13. Thus a more constant mixture and economy of solvent or cleaning fluid are maintained to insure a more uniform turbulent flow produced in the turbulator 20. Also connected to the E/P transducer 50 are digital and analog output circuits 54 and 55, respectively, for indicating to the operator of the system what the air pressures and their fluctuations are during the operation of the system.

Figure 1B:
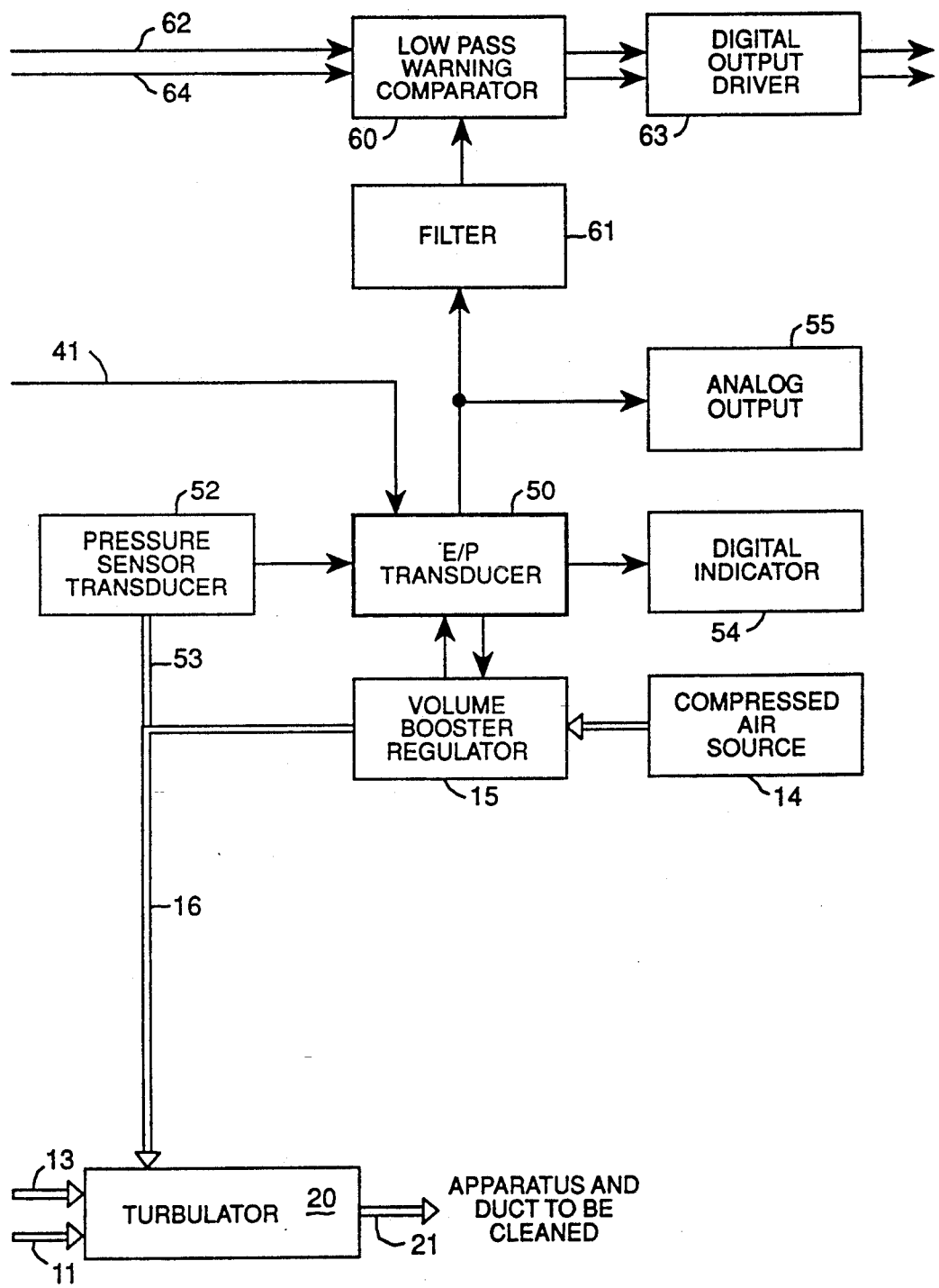

A safety circuit to insure effective turbulation in the turbulator 20 is also provided in FIG. 1B connected to the analog output from the air pressure controller transducer 50 by passing the analog signal through a low pressure warning circuit. This warning circuit comprises a low pass filter 61, a low pressure warning comparator circuit 60 and a digital output signal driver 63. Connected to this comparator circuit 60 via conductors 62 and 64 are signals from the two current-to-voltage converters 31 and 33 (see FIG. 1A). These signals correspond to the source pressures for the solvents A and B and pass through active modes selective filters 71 and 73, respectively, to remove spurious and noise signals. When the gas or air pressure is below a predetermined amount corresponding to the pressure necessary to produce effective turbulence, the comparator circuit 60 will then generate a signal for each of the solvents, in comparison to the gas pressure from a low pass filter 61, to produce a digital output warning signal in circuit 63. This warning signal may operate a light on the operator's control panel, an audible alarm and/or automatically shut off the cleaning fluid and gas valves used in the cleaning process. This shut off would prevent improper cleaning and accidental entry of the cleaning fluid into the gas passages.

Referring now back to the voltage outputs from the converters 31 and 33 in FIG. 1A, which outputs correspond to the variations in pressure in the output lines 11 and 13 for solvents A and B, the separate active and signal selective filters 71 and 73 are also connected to the data selector 40 via summing junctions 72 and 74, respectively. However, during the active mode of the system the filters 71 and 73 take over control through these summing junctions 72 and 74 to be sure that the transducer 50 controls the valves in the volume booster regulator 15 in accordance with all variations of pressure of the solvent A or B during operation of the turbulator 20.

The purpose of the low pass filters 75 and 77, also connected to the converters 31 and 33 in FIG. 1A, is to average out fluctuations int he pressures from the solvent sources A and B during standby operation. Thus, fluctuations in pressure of the solvents will minimize operation of the valves in the regulator 15, thereby increasing the life of these valves.

The selection of the solvent A or B and their timing to be employed in the turbulator 20 is controlled by a circuit 80 in FIG. 1A connected to the data selector 40. This control may be automatic or manual as required for the particular ducts that are to be cleaned.

Further, outside control of the system may be through manual or remote-controlled enrichment circuits 90 and 92, respectively, also in FIG. 1A, which in turn are connected to an enrichment selector 94 connected to each of the summing junctions 72 and 74. The enrichment selector 94 also has outputs 95 which can be connected to meters on the operator's control panel. Connected to the remote enrichment circuit 92 there may be other automatic enhancement control circuits whereby the relative pressures between a solvent and gas in the turbulator are varied during turbulation and not just for different solvents. This enables increased scrubbing or cleaning at different times during the cleaning operation, that is by use of more solvent and less gas in the mixture or vice versa. Furthermore, in this regard, because of the ability to make these variations, it is also possible that in the operation of the circuit that purging and cleaning can be simultaneously performed in the duct, which combination may require the special control of the enhancement circuit 96.

The operation of the system and the enhancement or enrichment circuits are usually under the control of a computer when automatic cleaning is desired, such as in a spray-painting assembly line conveyor system. Thus when the paint is cut off, immediately the turbulation may be turned into the duct to purge the paint as well as clean the line, and then when the line is cleaned, the mixture is cut off and the gas or air may then be blown through the line to dry it before the next paint or liquid is applied to the duct. Furthermore, pure solvent also may be employed by being programmed into the system. However, since solvents are very expensive to dispose of, it is desirable to use as little solvent as possible and the turbulation of solvent with gas or air according to this system has been found to employ much less solvent than in prior cleaning systems, and thus reduce the expense of its disposal.

Although blocks are shown and described above as to the functions of different electronic circuits, it should be understood that these are standard control circuits which are often employed in computers and may be programmed for producing the operations described.

Also some of these operations may even be combined with operations of other standard circuits.

While there is described above the principles of this invention in connection with specific apparatus, it is to be clearly understood that this description is made only by way of example and not as a limitation to the scope of this invention.

We claim:

1. A system for cleaning a duct for fluidized material, said system comprising:
   A) separate sources of a pressurized cleaning fluid and a compressed gas,
   B) means for mixing said compressed gas and said cleaning fluid to a predetermined pressure difference to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a feedback circuit for sensing the pressure of said gas to said mixing means to control further the gas pressure to said mixing means to insure less than 1 psi difference in the predetermined pressure difference between said gas and said cleaning fluid.

2. A system according to claim 1 including a plurality of cleaning fluids.

3. A duct for fluidized material comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a low pressure comparator for signalling a compressed gas pressure below a predetermined amount required for producing effective turbulence with said cleaning fluid in said mixing means.

4. A system according to claim 3 including a plurality of cleaning fluids.

5. A duct for fluidized material comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a standby low pass filter means for averaging control signals from said cleaning fluid pressure sensing means to reduce operation of said gas pressure controlling means when said system is in a standby mode.

6. A system according to claim 5 including a plurality of cleaning fluids.

7. A duct for fluidized material comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a separate means for varying the pressures of said gas and said cleaning fluid during their turbulence in cleaning said duct.

8. A system according to claim 7 including a plurality of cleaning fluids.

9. A system for cleaning a duct for fluidized material, said system comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a feedback circuit for sensing the pressure of said gas to said mixing means to control further the gas pressure to said mixing means to insure less than 1 psi difference in the predetermined pressure difference between said gas and said cleaning fluid, and
   b) a low pressure comparator for signalling a compressed gas pressure below a predetermined amount required for producing effective turbulence with said cleaning fluid in said mixing means.

10. A system according to claim 9 wherein said improvement also comprises:
    a) a standby low pass filter means for averaging control signals from said cleaning fluid pressure sensing means to reduce operation of said gas pressure controlling means when said system is in a standby mode.

11. A system according to claim 10 wherein said improvement also comprises:
    a) separate means for varying the pressures of said gas and said cleaning fluid during their turbulence in cleaning said duct.

12. A system according to claim 9 wherein said improvement also comprises:

a) separate means for varying the pressures of said gas and said cleaning fluid during their turbulence in cleaning said duct.

13. A system for cleaning a duct for fluidized material, said system comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a feedback circuit for sensing the pressure of said gas to said mixing means to control further the gas pressure to said mixing means to insure less than 1 psi difference in the predetermined pressure difference between said gas and said cleaning fluid, and
   b) a standby low pass filter means for averaging control signals from said cleaning fluid pressure sensing means to reduce operation of said gas pressure controlling means when said system is in a standby mode.

14. A system according to claim 13 wherein said improvement also comprises:
   a) separate means for varying the pressures of said gas and said cleaning fluid during their turbulence in cleaning said duct.

15. A system for cleaning a duct for fluidized material said system comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a feedback circuit for sensing the pressure of said gas to said mixing means to control further the gas pressure to said mixing means to insure less than 1 psi difference in the predetermined pressure difference between said gas and said cleaning fluid, and
   b) separate means for varying the pressures of said gas and said cleaning fluid during their turbulence in cleaning said duct.

16. A duct for fluidized material comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a low pressure comparator for signalling a compressed gas pressure below a predetermined amount required for producing effective turbulence with said cleaning fluid in said mixing means, and
   b) a standby low pass filter means for averaging control signals from said cleaning fluid pressure sensing means to reduce operation of said gas pressure controlling means when said system is in a standby mode.

17. A duct for fluidized material comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a low pressure comparator for signalling a compressed gas pressure below a predetermined amount required for producing effective turbulence with said cleaning fluid in said mixing means, and
   b) separate means for varying the pressures of said gas and said cleaning fluid during their turbulence in cleaning said duct.

18. A duct for fluidized material comprising:
   A) separate sources of a pressurized cleaning fluid and a compressed gas,
   B) means for mixing said compressed gas and said cleaning fluid to produce a turbulent mixture,
   C) means for sensing the pressure of said cleaning fluid,
   D) means for controlling the pressure of said gas to said mixing means, and
   E) a control system connected to said sensing means and said controlling means for regulating the pressure of said gas to said mixing chamber for producing turbulent flow of said mixture in said duct for cleaning said duct,
   the improvement comprising:
   a) a standby low pass filter means for averaging control signals from said cleaning fluid pressure sensing means to reduce operation of said gas pressure controlling means when said system is in a standby mode, and
   b) separate means for varying the pressures of said gas and said cleaning fluid during their turbulence in cleaning said duct.

19. A system according to claim 18 wherein said improvement also comprises:
   a) a low pressure comparator for signalling a compressed gas pressure below a predetermined amount required for producing effective turbulence with said cleaning fluid in said mixing means.

20. In a system for cleaning a duct with a turbulent gas and cleaning fluid mixture having:
  A) a turbulator,
  B) a source of pressurized gas connected to said turbulator,
  C) a source of pressurized cleaning fluid connected to said turbulator,
  D) a first gas pressure transducer for controlling the gas from said gas source,
  E) a fluid pressure transducer for sensing the pressure from said cleaning fluid source,
  F) circuit means for connecting said fluid pressure transducer to said first gas transducer, and
  G) a regulator valve means connected to said first gas transducer for controlling the gas pressure to said turbulator in accordance with the pressure of said cleaning fluid,
the improvement comprising:
  a) a second gas pressure transducer for sensing the pressure of said gas to said turbulator, and
  b) circuit means for feeding backs signals from said second gas pressure transducer for further controlling said regulator valve means to insure a predetermined difference of less than 1 psi between said cleaning fluid pressure and said gas pressure in said turbulator.

21. A system according to claim 20 including:
  a) a filter means connected to said first gas pressure transducer,
  b) a low pressure comparator circuit connected to said first gas pressure transducer for sensing said compressed gas for detecting a predetermined compressed gas pressure below that necessary for producing effective turbulence in said turbulator, and
  c) warning signal generator connected to said comparator responsive to the detection of said predetermined low compressed gas pressure.

22. A system according to claim 21 wherein said improvement also comprises:
  a) a standby low pass filter means for averaging control signals from said cleaning fluid pressure sensing means to reduce operation of said gas pressure controlling means when said system is in a standby mode.

23. A system according to claim 22 wherein said improvement also comprises:
  a) separate means for varying the pressures of said gas and said cleaning fluid during their turbulence in cleaning said duct.

24. A system according to claim 21 wherein said improvement also comprises:
  a) separate means for varying the pressures of said gas and said cleaning fluid during their turbulence in cleaning said duct.

25. A system according to claim 20 including a standby low pass filter means connected to said fluid transducer for sensing cleaning fluid pressure for averaging the signals from the cleaning fluid pressure sensing transducer to reduce fluctuations in the operation of said valve means in said volume booster regulator when said system is in a standby mode.

26. A system according to claim 25 wherein said improvement also comprises:
  a) separate means for varying the pressure of said gas and said cleaning fluid during their turbulence in cleaning said duct.

27. A system according to claim 20 including separate means for varying the relative difference in pressures of said gas and said cleaning fluid during their turbulence in cleaning a duct.

28. In a system for cleaning a duct with a turbulent gas and cleaning fluid mixture having:
  A) a turbulator,
  B) a source of pressurized gas connected to said turbulator,
  C) a source of pressurized cleaning fluid connected to said turbulator,
  D) a first gas pressure transducer for controlling the gas from said gas source,
  E) a fluid pressure transducer for sensing the pressure from said cleaning fluid source,
  F) circuit means for connecting said fluid pressure transducer to said first gas transducer, and
  G) a regulator valve means connected to said first gas transducer for controlling the gas pressure to said turbulator in accordance with the pressure of said cleaning fluid,
the improvement comprising:
  a) a filter means connected to said first gas pressure transducer,
  b) a low pressure comparator circuit connected to said first gas pressure transducer for sensing said compressed gas for detecting a predetermined compressed gas pressure below that necessary for producing effective turbulence in said turbulator, and
  c) warning signal generator connected to said comparator responsive to the detection of said predetermined low compressed gas pressure.

29. A system according to claim 28 including a standby low pass filter means connected to said fluid transducer for sensing cleaning fluid pressure for averaging the signals from the cleaning fluid pressure sensing transducer to reduce fluctuations in the operation of said valve means in said volume booster regulator when said system is in a standby mode.

30. A system according to claim 28 including separate means for varying the relative difference in pressures of said gas and said cleaning fluid during their turbulence in cleaning a duct.

31. In a system for cleaning a duct with a turbulent gas and cleaning fluid mixture having:
  A) a turbulator,
  B) a source of pressurized gas connected to said turbulator,
  C) a source of pressurized cleaning fluid connected to said turbulator,
  D) a first gas pressure transducer for controlling the gas from said gas source,
  E) a fluid pressure transducer for sensing the pressure from said cleaning fluid source,
  F) circuit means for connecting said fluid pressure transducer to said first gas transducer, and
  G) a regulator valve means connected to said first gas transducer for controlling the gas pressure to said turbulator in accordance with the pressure of said cleaning fluid,
the improvement comprising:
  a) a standby low pass filter means connected to said fluid transducer for sensing cleaning fluid pressure for averaging the signals from the cleaning fluid pressure sensing transducer to reduce fluctuations in the operation of said valve means in said volume booster regulator when said system is in a standby mode.

32. A system according to claim 31 including separate means for varying the relative difference in pressures of said gas and said cleaning fluid during their turbulence in cleaning a duct.

33. A system according to claim 32 wherein said improvement also comprises:
   a) a low pressure comparator for signalling a compressed gas pressure below a predetermined amount required for producing effective turbulence with said cleaning fluid in said mixing means.

34. In a system for cleaning a duct with a turbulent gas and cleaning fluid mixture having:
   A) a turbulator,
   B) a source of pressurized gas connected to said turbulator,
   C) a source of pressurized cleaning fluid connected to said turbulator,
   D) a first gas pressure transducer for controlling the gas from said gas source,
   E) a fluid pressure transducer for sensing the pressure from said cleaning fluid source,
   F) circuit means for connecting said fluid pressure transducer to said first gas transducer, and
   G) a regulator valve means connected to said first gas transducer for controlling the gas pressure to said turbulator in accordance with the pressure of said cleaning fluid, the improvement comprising:
   a) separate means for varying the relative difference in pressures of said gas and said cleaning fluid during their turbulence in cleaning a duct.

35. A system for purging and cleaning a duct with a mixture of a turbulent gas and cleaning fluid, said system comprising a pressurized source of said cleaning fluid, a pressurized source of said gas, a turbulator, and control means for controlling the relative pressures between said gas and said cleaning fluid, the improvement comprising:
   1) a feedback circuit for sensing the pressure of the gas to the turbulator to control said gas pressure in accordance with the pressure of said cleaning fluid to insure in said turbulator less than one pound per square inch difference in the predetermined pressure of said gas with respect to the pressure of said cleaning fluid,
   2) a low pressure comparator for signalling a compressed pressure below a predetermined amount required for producing effective turbulence with said cleaning fluid in said turbulator,
   3) a standby low pass filter means for averaging control signals from sensing said solvent pressure to reduce operation of said control valves when said system is in standby mode, and
   4) separate means for varying the pressures of said gas with respect to the pressure of said cleaning liquid during their turbulence in cleaning a duct.

* * * * *

UNITED STATES PATENT AND TRADEMARK OFFICE
CERTIFICATE OF CORRECTION

PATENT NO. : 5,287,867
DATED : February 22, 1994
INVENTOR(S) : Raymond G. Plummer et al It is certified that error appears in the above-indentified patent and that said Letters Patent is hereby corrected as shown below:

Column 1, line 32, after "gas" insert - - and - - .

Column 2, line 29, change "valve" to - - valves - - .

Column 12, line 9, change "means" to - - valves - - .

Signed and Sealed this

Twenty-sixth Day of July, 1994

Attest:

BRUCE LEHMAN

*Attesting Officer*  *Commissioner of Patents and Trademarks*